Figure 1:
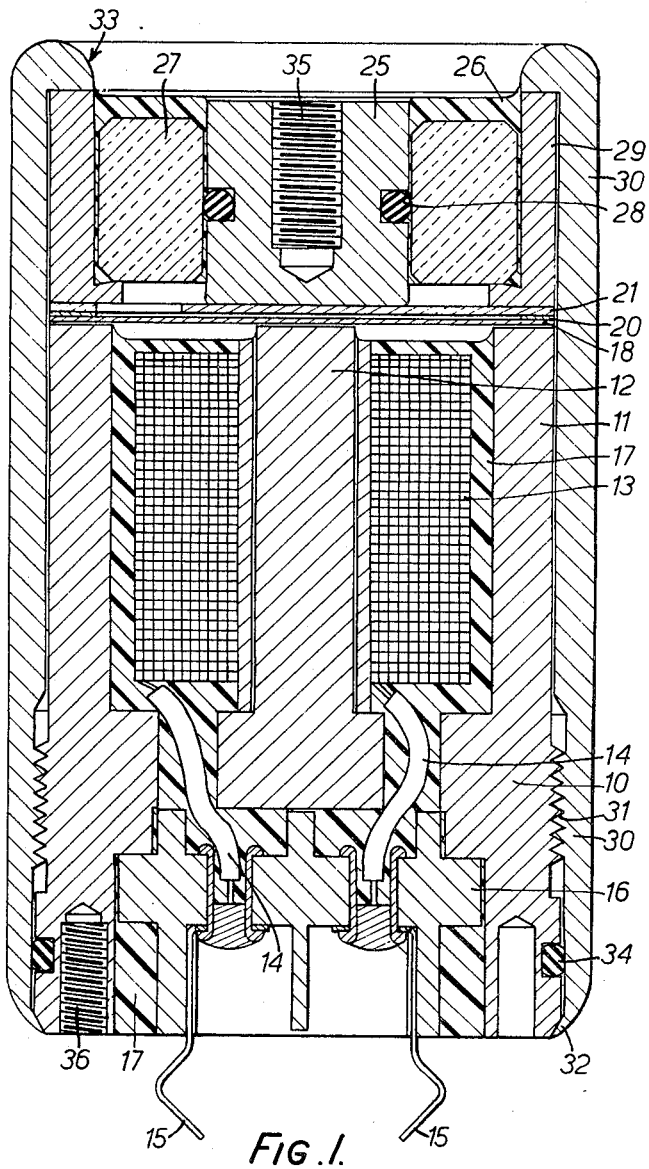

May 17, 1966 R. W. DUNCAN 3,252,064
ELECTRIC VARIABLE CAPACITOR
Filed Sept. 17, 1963

INVENTOR
ROBERT WILLIAM DUNCAN
BY
Hane and Nydick
ATTORNEYS

United States Patent Office 3,252,064
Patented May 17, 1966

3,252,064
ELECTRIC VARIABLE CAPACITOR
Robert William Duncan, Shepperton, Middlesex, England, assignor to Electronic Instruments Limited
Filed Sept. 17, 1963, Ser. No. 309,420
Claims priority, application Great Britain, Sept. 20, 1962, 35,831/62
12 Claims. (Cl. 317—250)

This invention relates to electric variable capacitors, and to means for indicating measuring or amplifying electric voltages or charges using such capacitors.

A requirement exists for means to respond to very small direct voltages or charges and in one form of apparatus for this purpose there is used a capacitor the capacitance of which is cyclically varied; the input voltage or charge is applied to the capacitor which then serves as a modulating device to produce an alternating voltage output, the frequency of which is the frequency of variation of the capacitance, and the amplitude of which is a function of the applied voltage or charge. This alternating voltage can then be amplified or otherwise handled by apparatus of more conventional design and the amplified signal before or after demodulation, will also be a function of the input.

Where, as is often the case when this type of apparatus is used, the input voltage or charge is minute, the design of a satisfactory variable capacitor is a matter of difficulty. For example, the percentage change of capacitance in the cycle of change should be as large as possible; and the capacitor should be such that any incidental effects that are likely to evidence themselves, in use, as changes in the output voltage should be avoided. In this connection, one form of capacitor suitable for this purpose employs two electrodes, one of which is vibrated; we have found that a capacitor of this kind while generally satisfactory, may produce slight irregularities in the output when first used after a period of disuse. The reason for this is not clear, but may be due to the development of a slight difference of potential between the electrodes.

The present invention is concerned with an improved form of capacitor for this use, and the invention consists of an electrical variable capacitor comprising two electrodes presenting confronting surfaces, driving means for cyclically varying the separation of said surfaces and thereby the capacitance of the capacitor, and means for biasing said surfaces into electrical contact when said driving means is inoperative.

Preferably, the driving means is electromagnetic and is operative to drive said electrodes in response to both an alternating driving current and a direct driving current applied simultaneously.

The invention also concerns an apparatus including an electrical variable capacitor comprising two electrodes presenting confronting surfaces, driving means for cyclically varying the separation of said surfaces and thereby the capacitance of the capacitor, and means for biasing said surfaces into electrical contact when said driving means is inoperative, and comprising means for varying the magnitude of said direct driving current in accordance with changes in the value of the alternating driving current.

As will appear hereinafter, it is highly advantageous if said capacitor includes a driving coil, and means including a rectifier for feeding to said coil a rectified alternating current. If the electrodes are initially in contact the effect is then obtained that the mean separation of the electrodes varies automatically should the pulsating component change in amplitude, which reduces the sensitivity of the system to changes in the alternating current supply used to drive the magnetic system, and permits a greater percentage change of capacitance than could be obtained in a capacitor in which the electrode separation is set at a value large enough to ensure that the electrodes will not touch in use.

With the electrode in contact when at rest, it is found also that the irregularities after disuse, mentioned above, are substantially eliminated.

Figure 2:
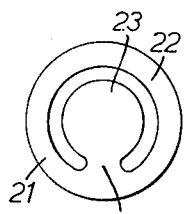

Other features and advantages of the invention will appear from the following description of one embodiment thereof, given by way of example, in conjunction with the accompanying drawings in which:

FIGURE 1 is a transverse section through a variable capacitor constructed in accordance with the invention; and FIGURE 2 is a plan view of the vibrating electrode of the capacitor on a reduced scale.

The capacitor comprises a body 10 of magnetic material presenting a magnetic structure including an outer cylindrical portion 11 and a central core 12. Within the annular space between these parts is disposed a winding 13; leads 14 extend from the ends of the winding to contact member 15 carried upon an insulating support 16 which is sealed to the lower part of the body 10, as by a suitable sealing material at 17.

The upper surfaces of the outer cylindrical portion 11 and the core 12 are lapped flat so as to lie accurately in a common plane and against these surfaces is disposed a disc 18 of non-magnetic metal such as brass or copper, to act as an electrostatic shield. Next disc 18 is a thin annular shim 20 which serves as a spacer between disc 18 and a vibrating electrode 21. The electrode 21 has the shape indicated in FIGURE 2 and includes an outer annular portion 22 and a central and approximately circular portion 23 joined with portion 22 through an integral neck 24. The electrode 21, being of magnetic material, will be attracted to the pole face of the central core 12 when an energising current is applied to winding 13.

The stationary electrode 25 of the capacitor is in the form of a cylinder of metal having its circumference or outer portion secured, for example by epoxy resin at 26 to a ring 27 of a highly insulating material such as a ceramic. To prevent any magnetic attraction occurring between the electrodes when the capacitor is not in use, electrode 25 is made of a non-magnetic metal. An O-ring 28 is arranged between electrode 25 and ring 27 accommodated in a groove in the electrode. Ring 27 is supported in an annulus 29 of metal, of approximately the same external diameter as the portion 11 of the body. All the parts are held in position by a screwed cap 30, engaging a threaded part 31 of the body and, if desired, swaged permanently in position as at 32. The cap has a central opening 33 in its end, to permit access for connection to electrode 25. The construction is sealed against the entry of moisture and air by means of a greased sealing ring 34 of resilient material such as neoprene. Electrode 25 has a central socket opening 35 for the reception of a connecting lead.

Electrode 21 is in electrical contact with the body 10 so that connection can be made to the body and hence to the electrode by one or more screws inserted in threaded bores 36, by which the body can also be mounted.

The electrode 21 is made so that it is accurately flat; it is made by first softening a sheet of suitable magnetic material, the sheet being de-scaled if necessary. The electrode is then punched out and de-burred, hardened and tempered, and then flattened and then cleaned. Finally, the electrode is lapped accurately.

With the arrangement described, the electrode 21 lies initially in contact with electrode 25; to operate the capacitor there is applied to the winding 13 a current that includes both pulsating and unidirectional components. A highly convenient method of producing a suitable current is to rectify an alternating current by any convenient rectifier. Thereby the unidirectional component causes the moving electrode 21 to be withdrawn from contact with electrode 25 and the pulsating component causes the desired cyclic variation of separation, and hence of capacitance between the electrodes.

The magnetic field B in the core of the electromagnet is given by the relationship:

$$B = \frac{4\pi n i}{\frac{A}{l_e} \sum_r \left(\frac{l_r}{\mu_r S_r}\right)} \qquad (1)$$

where:

$n$ is the number of turns of the winding
$i$ is the current in absolute units (i.e. amperes/10)
$A$ is the cross-sectional area
$l_e r$ is the effective path length
$\mu_r$ is the permeability
$S_r$ is the elemental cross-sectional area The force $F$ between the pole faces of the electromagnet will be given by the equation $$F = \frac{B^2 A}{8\pi} \qquad (2)$$

Substituting for B in Equation 2 gives the equation $$F = \frac{16\pi^2 n^2}{\left[\frac{A}{l_e^2}\sum_r \frac{l_r}{\mu_r S_r}\right]^2} \cdot i^2 \qquad (3)$$

which can be written in the form:

$$F = K i^2$$

The Fourier expansion for a full wave rectified sine wave $$E_0 \sin\left(\frac{\omega t}{2}\right)$$

is given by the equation $$E = \frac{2}{\pi} E_0 \left[ 1 + \frac{2}{3} \cos \omega t - \frac{2}{15} \cos 2\omega t + \cdots \right] \qquad (4)$$

If this voltage is applied to the coil the current will be given by the equation $$i = \frac{2}{\pi} E_0 \left[ \frac{1}{r} + \frac{2}{3} \frac{\cos \omega t}{\sqrt{r^2 + \omega^2 L^2}} - \frac{2}{15} \frac{\cos 2\omega t}{\sqrt{r^2 + 4\omega^2 L^2}} + \cdots \right] \qquad (5)$$

where $r$ is the resistance and $L$ the inductance of the winding.

In a practical case, Equation 5 can be rearranged, with an accuracy of about 1%, in the form of the equation $$i^2 = \frac{4}{\pi^2} E_0^2 \left[ \left\{ \frac{1}{r^2} + \frac{2}{9}\left(\frac{1}{r^2 + \omega^2 L^2}\right) \right\} + \left\{ \frac{4}{3} \cdot \frac{\frac{1}{r} - \frac{1}{15}\frac{1}{\sqrt{r^2+\omega^2 L^2}}}{\sqrt{r^2+\omega^2 L^2}} \right\} \cos \omega t + \text{terms in } n\omega t \right] \qquad (6)$$

The amplitude $Z(x,t)$ of vibration of a cantilever under force $f_1(X_a) \sin \omega t$ is given by the equation $$Z(X,t) = \frac{f_1(X_a) \sin \omega t}{m\omega_1^2} \cdot \left[ \sum_{n=1}^{\infty} \frac{\phi_n(X_a)\phi_n(X)}{\left[\frac{\omega_n^2}{\omega_1^2} - \frac{\omega^2}{\omega_1^2}\right]} \right] \qquad (7)$$

and the static deflection $Z(x)$ of a cantilever under force $f_2(X_a)$ is given by the equation $$Z(X) = \frac{f_2(X_a)}{m\omega_1^2} \cdot \left[ \sum_{n=1}^{\infty} \frac{\phi_n(X_a)\phi_n(X)}{\omega_n^2/\omega_1^2} \right] \qquad (8)$$

where $\phi_n$ is given by the equation $$\phi_n = \cosh \beta_n X - \cos \beta_n X - \alpha_n[\sinh \beta_n X - \sin \beta_n X] \qquad (9)$$

and $\omega n$ by the equation $$\omega_n^2 = \frac{\beta_n^4 l E I}{n} \qquad (10)$$

$\alpha_n$ in Equation 9 is defined by the equation $$\alpha_n = \frac{\cosh \beta_n l - \cos \beta_n l}{\sinh \beta_n l + \sin \beta_n l} \qquad (11)$$

and $\beta_n$ by the equation
$\beta_n$ are roots of the equation $$1 + \cosh \beta l \cos \beta l = 0 \qquad (12)$$

The electrodes of the capacitor are separated by a force produced by unidirectional component of the driving current, and the moving electrode is vibrated at frequency $\omega$ by the pulsating current of that frequency.

The efficiency $\eta$ of conversion of direct to alternating current is directly related to the distance of separation and amplitude of vibration. With an initial separation of $d_0$, the efficiency is given by the equation $$\eta = \frac{|Z(X,t)|}{Z(X) + d_0} \qquad (13)$$

or in expanded form in the equation $$\eta = \frac{\dfrac{f_1(X_a)}{m\omega_1^2}\left[\displaystyle\sum_{n=1}^{\infty} \dfrac{\phi_n(X_a)\phi_n(X)}{\dfrac{\omega_n^2}{\omega_1^2} - \dfrac{\omega^2}{\omega_1^2}}\right]}{\dfrac{f_2(X_a)}{m\omega_1^2}\left[\displaystyle\sum_{n=1}^{\infty} \dfrac{\phi_n(X_a)\phi_n(X)}{\dfrac{\omega_n^2}{\omega_1^2}}\right] + d_0} \qquad (14)$$

If the separation $d_0$ is constant then it will be seen that the efficiency of conversion is a function of amplitude. With the present arrangement, $d_0$ is zero, and so the efficiency reduces to the expression in the equation $$\eta = \frac{f_1(X_a)}{f_2(X_a)} \cdot \frac{\displaystyle\sum_{n=1}^{\infty}\left[\dfrac{\phi_n(X_a)\phi_n(X)}{\dfrac{\omega_n^2}{\omega_1^2} - \dfrac{\omega^2}{\omega_1^2}}\right]}{\displaystyle\sum_{n=1}^{\infty}\left[\dfrac{\phi_n(X_a)\phi_n(X)}{\omega_n^2/\omega_1^2}\right]} \qquad (15)$$

For a simple cantilever $(\omega_2^2/\omega_1^2)$ is about 39; $\omega_3^2/\omega_1^2$ is about 308 and $\omega_4^2/\omega_1^2$ is about 1182 where $\omega_1$, $\omega_2$, $\omega_3$ and $\omega_4$ are the first four harmonic frequencies of the cantilever. Provided that $\omega^2$ is much larger than $\omega_1^2$, which is so, the efficiency approximates to the expression in the equation $$\eta = \frac{f_1(X_a)}{f_2(X_a)} \cdot \left[\frac{1}{1 - \dfrac{\omega^2}{\omega_1^2}}\right] \qquad (16)$$

The expressions for $f_1(X_a)$ and $f_2(X_a)$ are then as in the equations $$f_1(X_a) = \frac{256 n^2 E_0^2}{3 A \left[\sum_r \frac{l_r}{\mu_r^1 S_r}\right]^2 100} \cdot \left[\frac{\left(\frac{1}{r} - \frac{1}{15}\frac{1}{\sqrt{r^2+\omega^2 L^2}}\right)}{\sqrt{r^2+\omega^2 L^2}}\right] \qquad (17)$$

$$f_2(X_a) = \frac{16 n^2}{A\left[\sum_r \frac{l_r}{\mu_r S_r}\right]^2 100} \cdot 4 E_0^2 \left[\frac{1}{r^2} + \frac{2}{9}\frac{1}{(r^2+\omega^2 L^2)}\right] \qquad (18)$$

where $\mu_r^1$ is the permeability at frequency $\omega$ and $\mu_r$ is the permeability at zero frequency. If the air gap is reasonably large and $\mu_r^1$ approaches $\mu_r$ the final expression for efficiency is given by the equation $$\eta = \frac{\left(\dfrac{1}{r} - \dfrac{1}{15}\dfrac{1}{\sqrt{r^2+\omega^2 L^2}}\right)}{\left(\dfrac{1}{r^2} + \dfrac{2}{9}\dfrac{1}{r^2+\omega^2 L^2}\right)\left(\dfrac{1}{\sqrt{r^2+\omega^2 L^2}}\right)\left(1 - \dfrac{\omega^2}{\omega_1^2}\right)} \qquad (19)$$

This treatment does not take into account certain factors, such as the air damping of the moving electrode, the rotary inertia, the variation in the air gap dimension as the moving electrode vibrates, and the variation of permeability with frequency but with this reservation, the expression for the efficiency shows that it is determined principally by the design constants of the magnetic drive winding.

For a coil with a resistance high in relation to the reactive impedance, the efficiency is also largely independent of the supply voltage and frequency; this is of much practical importance. For the same condition, the efficiency is independent of coil resistance, which is also of practical importance.

Further, the efficiency is largely independent of the magnetic circuit, and depends only to a second order degree on the mechanical properties of the reed.

In this way, the device described is highly advantageous in providing more stable operation.

I claim:

1. An electrical variable capacitor comprising two electrodes presenting confronting surfaces in direct physical contact with each other in the rest condition of the electrodes, and driving means for cyclically separating said surfaces and varying said separation when and while said electrodes are driven, thereby correspondingly varying the capacitance of the capacitor.

2. A capacitor according to claim 1, wherein said driving means is an electromagnetic driving means operative to drive said electrodes in response to both an alternating driving current and a direct driving current applied simultaneously.

3. A capacitor according to claim 1 wherein a mechanically resilient supporting means biases one of said electrodes into direct physical contact with the other one of the electrodes, said one electrode being driven by driving means against the bias acting upon the same by the action of said supporting means.

4. A capacitor according to claim 3, wherein the other of said electrodes is of non-magnetic material to prevent the occurrence of a magnetic attractive force between the electrodes when said driving means is non-operating.

5. A capacitor according to claim 3, wherein said one electrode includes an outer, rigidly mounted, surrounding portion and an integrally formed, relatively flexible inner portion.

6. A capacitor according to claim 5, wherein said outer portion is annular and said inner portion is circular in shape.

7. A capacitor according to claim 3, wherein the other one of said electrodes is secured to an annular insulator which is supported in a metal ring, said ring being clamped to an outer cylindrical portion of the magnetic structure by means of a cap which is releasably attached to said outer cylindrical portion.

8. A capacitor according to claim 7, and including means for spacing apart the outer portion of said one electrode and said ring.

9. A capacitor according to claim 3, wherein said one electrode is electrostatically shielded from said driving means.

10. A capacitor according to claim 3, wherein said one electrode is disposed between the driving means and the other of said electrodes.

11. Apparatus including a variable capacitor in accordance with claim 1, wherein said driving means is electromagnetic and is operative to drive said electrodes in response to both an alternating driving current and a direct driving current applied simultaneously, and further comprising means for varying the magnitude of said direct driving current in accordance with changes in the value of the alternating driving current.

12. Apparatus according to claim 11, wherein said capacitor includes a driving coil, and means including a rectifier for feeding to said coil a rectified alternating current.

References Cited by the Examiner

UNITED STATES PATENTS

| 573,294 | 12/1896 | Ray | 178—181 X |
|---|---|---|---|
| 2,632,791 | 3/1953 | Side | 317—249 |
| 2,751,530 | 6/1956 | Armstrong | 317—246 |
| 2,830,240 | 4/1958 | Speer | 317—250 |
| 2,867,758 | 1/1959 | Wilstead | 317—250 |
| 3,000,215 | 9/1961 | Atanasoff. | |
| 3,020,455 | 2/1962 | Reifel | 317—250 |

FOREIGN PATENTS 898,903  4/1945  France.

ROBERT K. SCHAEFER, *Primary Examiner.*

JOHN F. BURNS, *Examiner.*

E. A. GOLDBERG, *Assistant Examiner.*